US006463106B1

United States Patent
Prasanna

(10) Patent No.: US 6,463,106 B1
(45) Date of Patent: Oct. 8, 2002

(54) RECEIVER WITH ADAPTIVE PROCESSING

(75) Inventor: G. N. Srinivasa Prasanna, Bridgewater, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/193,284

(22) Filed: Nov. 18, 1998

(51) Int. Cl.$^7$ ................................................ H04L 27/22
(52) U.S. Cl. ........................ 375/316; 375/332; 375/344
(58) Field of Search ................................. 375/224, 226, 375/232, 281, 332, 340, 324, 326, 344, 346, 350, 355, 316; 329/304

(56) References Cited

U.S. PATENT DOCUMENTS

| | | | | |
|---|---|---|---|---|
| 4,647,968 A | * | 3/1987 | Willis | 341/155 |
| 5,163,434 A | * | 11/1992 | Kumazawa | 600/455 |
| 5,471,508 A | * | 11/1995 | Koslov | 375/344 |
| 5,471,661 A | * | 11/1995 | Atkinson | 331/17 |
| 5,495,203 A | * | 2/1996 | Harp et al. | 329/306 |
| 5,812,594 A | * | 9/1998 | Rakib | 375/219 |
| 5,872,812 A | * | 2/1999 | Saito et al. | 375/261 |
| 6,061,393 A | * | 5/2000 | Tsui et al. | 375/224 |
| 6,167,095 A | * | 12/2000 | Furukawa et al. | 375/285 |

\* cited by examiner

Primary Examiner—Young T. Tse
(74) Attorney, Agent, or Firm—Steve Mendelsohn

(57) ABSTRACT

A receiver for signals generated using a modulation scheme such as quadrature-phase shift-keying (QPSK) modulation. The receiver characterizes the variance in the detected signal constellation and, when appropriate, adjusts at least some part of its processing in order to reduce power consumption or error rate. For example, when the variance is low and full receiver operation is not required to achieve accurate phase detection, one or more of the following changes are made to reduce power consumption: the resolution of the A/D converter is reduced, the precision of digital filtering is reduced, and/or one or more of the digital filters are turned off. If the variance in the detected signal constellation should increase, appropriate changes may be made to gradually restore the operations of the full receiver as needed to reduce error rate. In this way, the receiver can efficiently regulate its power consumption without jeopardizing the accuracy of its signal processing. In one application, the receiver is used in a remote node of a fiber-to-the-curb (FTTC) communication system, where power may be limited.

20 Claims, 1 Drawing Sheet

RECEIVER WITH ADAPTIVE PROCESSING

BACKGROUND OF THE INVENTION

1. Field of the Invention

The present invention relates to communications based on a modulation scheme, such as a phase-based modulation scheme like quadrature-phase, shift-keying (QPSK) modulation.

2. Description of the Related Art

In a typical fiber-to-the-curb (FTTC) telecommunication system, signals are transmitted between a central office (CO) and one or more remote nodes as optical signals over optical fibers, while signals are transmitted between each remote node and one or more consumer product equipment (CPE) units (e.g., telephones, faxes, computers) as electrical signals over copper wires. As such, each remote node has components for receiving downstream optical signals from the CO, converting the optical signals into electrical signals, and transmitting the electrical signals to the CPE units. Similarly, each remote node has components for receiving upstream electrical signals from the CPE units, converting the electrical signals into optical signals, and transmitting the optical signals to the CO.

In one possible implementation of an FTTC telecommunication system, at least some of the signals received by the remote nodes are signals that have been modulated using a phase-based modulation scheme, such as quadrature-phase, shift-keying (QPSK) modulation. For example, either or both of the downstream optical signals and/or the upstream electrical signals received by the remote nodes may be QPSK signals. In such an implementation, each remote node has one or more QPSK receivers for receiving the QPSK signals for subsequent conversion (i.e., from optical to electrical or from electrical to optical) and further transmission. In general, it is desirable to implement QPSK receivers that require relatively low amounts of power for use in the remote nodes of an FTTC telecommunication system where the power available at each remote node may be limited.

SUMMARY OF THE INVENTION

The present invention is directed to a scheme for efficiently using power in a receiver designed for QPSK or other modulated signals. According to one embodiment, the present invention is a receiver for an input signal generated using a modulation scheme, wherein the receiver is adapted to generate a variance of a constellation corresponding to the input signal and to adaptively adjust its processing based on the variance, for example, to reduce power consumption or error rate in the receiver.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
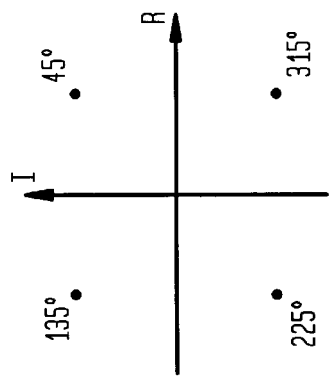
FIG. 1 shows the ideal locations of the four phases used in QPSK modulation.

FIG. 1 shows the ideal locations of the four phases (45°, 135°, 225°, and 315°) used in an exemplary QPSK modulation scheme as plotted relative to the real (R) and imaginary (I) axes of a two-dimensional phase space. In QPSK modulation, information is encoded in the phase of the signals. In order to convert QPSK signals, a receiver samples the signal stream at a sufficiently high rate to detect the locations of the zero crossings in the signal from which the phase of the signal can be derived.

In theory, the phase of a QPSK signal always corresponds exactly to one of the four locations shown in FIG. 1, with input data changes corresponding to phase transitions within the signal corresponding to changes from one ideal location to another ideal location. In a real system, however, transmission noise, variations in signal path, and other adverse effects cause the phase of a received QPSK signal to deviate from the four ideal phase locations of FIG. 1. In reality, the phase values, as detected in a real QPSK receiver, will be clustered about the four ideal phase locations in a signal constellation whose variance (i.e., the square of the standard deviation) from the ideal locations will be greater or smaller depending on the magnitude of the transmission noise and other adverse effects. In general, the greater the noise, the greater the variance of the constellation.

When the variance of the signal constellation is low (i.e, when the detected phase values are tightly clustered about the four ideal locations), the precision with which the receiver needs to operate in order to accurately detect the phase transitions in a QPSK signal is also low. During such times, according to the present invention, the operations of the receiver can be adjusted to save power.

Figure 2:
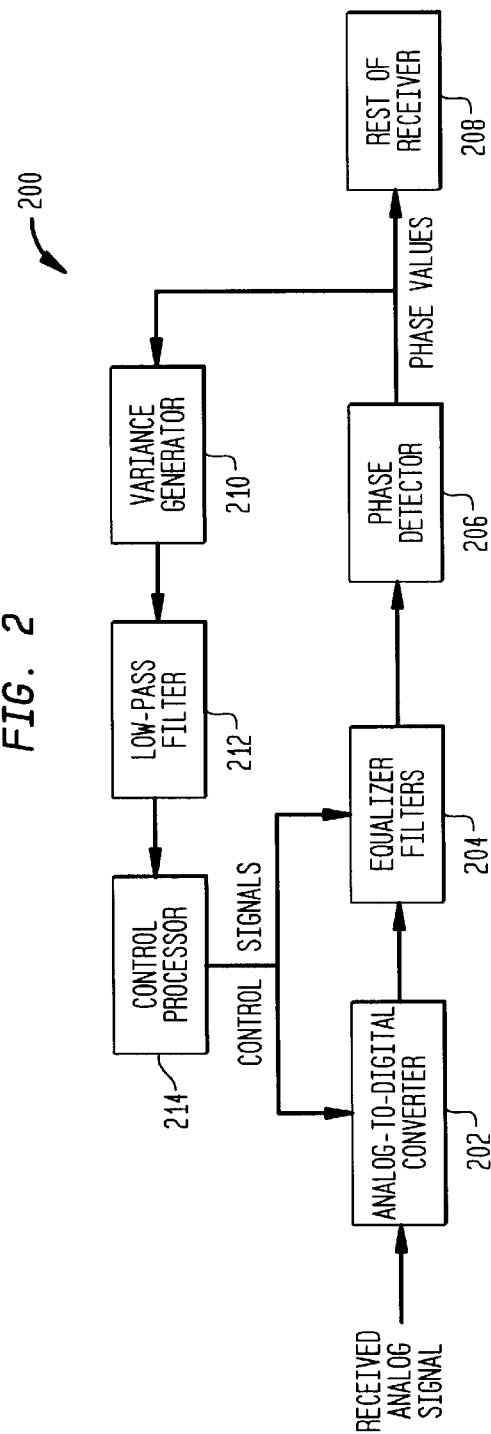
FIG. 2 shows a block diagram of a QPSK receiver, according to one embodiment of the present invention.

FIG. 2 shows a block diagram of a QPSK receiver 200, according to one exemplary embodiment of the present invention. Receiver 200 has an analog-to-digital converter 202 that digitizes a received analog signal, a set of equalizer filters 204 that filter the digitized signal to compensate for channel distortions, and a phase detector 206 that determines phase values in the input signal by detecting the locations of zero crossings in the filtered signal. Receiver 200 also has other conventional hardware 208 for further processing the detected phase values for subsequent decoding and/or retransmission.

According to the present invention, receiver 200 also has a variance generator 210 that characterizes the variance of the signal constellation based on the phase values generated by phase detector 206, a low-pass filter 212 that filters the characterized variance data to decrease the effects of anomalous data, and a control processor 214 that generates control signals based on the filtered variance data. In one embodiment, variance generator 210 generates a variance value for each set of samples falling within a specified timing window (computationally simpler approximation to the variance like the sum of absolute values can also be used). The various components in receiver 200 can be implemented on a single integrated circuit (IC) or on multiple ICs.

Depending on the implementation, the control signals generated by control processor 214 control one or more of the following characteristics of the processing implemented by receiver 200:

- The resolution of A/D converter 202 (i.e., the number of bits per value in the digitized signal);
- The precision of filters 204 (i.e., the number of bits preserved in the filter calculations); and/or
- Whether one or more of filters 204 are enabled or disabled.

In one embodiment, A/D converter 202 is a controllable processor that can digitize analog signals with a resolution that can be selected to be anywhere from, for example, 8 bits of resolution to a single bit of resolution, in which latter case A/D converter 202 operates as a hard limiter. Similarly, filters 204 may be a set of finite impulse response (FIR) filters of an equalizer, where the precision of the equalizer can be adjusted by turning on and off taps in the FIR filters, including completely disabling the equalizer.

In general, according to the present invention, control processor 214 controls the operations of A/D converter 202 and filters 204 to reduce the resolution and/or precision of the processing, when appropriate, in order to reduce power consumption in the processor. In particular, when the variance of the signal constellation is sufficiently low (e.g., as compared to specified threshold levels), the full complexity of the algorithms implemented by the receiver is not needed to accurately determine the phase values in the received input signal. During such times, power can be saved by (e.g., gradually) reducing the resolution of the A/D converter and/or the precision of the filters without jeopardizing the accuracy of the signal processing. If and when the constellation variance increases, the complexity of the operations can be (e.g., gradually) increased by increasing the resolution of the A/D converter and/or the precision of the filters to reduce the error rate and maintain the integrity of signal processing. In one implementation, a single receiver can be adaptively controlled to operate, at one extreme, with an 8-bit A/D converter and full equalization, and, at the other extreme, with hard-limiting and no equalization, with a variety of operating conditions in between, all selected based on the estimated constellation variance (e.g., with the A/D resolution being decreased in a linear fashion as the variance decreases).

Note that other signals can be used to control complexity of the receiver's operating algorithms.

For example, in a switched digital video (SDV) system, the transmission convergence (TC) chip knows approximately when far-end cross-talk (FEXT) is going to arrive, and can signal the receiver to go into a high-resolution state. Additionally, the control need not be exercised all the time. Typically, during initial equalizer convergence, the control will not be enabled, and the full A/D resolution and filter precision of the receiver will be used.

Although the present invention has been described in the context of a QPSK receiver, the present invention can also be implemented in receivers designed to process signals generated using other phase-based modulation schemes, such as bi-phase shift keying (BPSK) and other shift-keying schemes of higher order than QPSK. In addition, the present invention can be implemented in receivers designed to process signals generated using modulation schemes other than phase-based modulation schemes, such as various amplitude-based, frequency-based, or code-based modulation schemes.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A receiver for an input signal generated using a modulation scheme, wherein the receiver comprises:
   (a) an A/D converter adapted to digitize the input signal;
   (b) one or more digital filters adapted to filter the digitized signal;
   (c) a phase detector adapted to determine phase values in the filtered signal;
   (d) a variance generator adapted to generate the variance from the phase values; and
   (e) a control processor adapted to generate control signals to adaptively adjust the processing of at least one of the A/D converter and the one or more digital filters based on the variance.

2. The receiver of claim 1, wherein the control signals change resolution of the A/D converter.

3. The receiver of claim 1, wherein the control signals change a number of bits of precision in at least one of the digital filters.

4. The receiver of claim 1, wherein the control signals turn on and off at least one of the digital filters.

5. The receiver of claim 1, wherein the modulation scheme is a phase-based modulation scheme.

6. The receiver of claim 5, wherein the modulation scheme is a quadrature-phase shift-keying (QPSK) modulation scheme.

7. The receiver of claim 1, wherein the receiver is part of a remote node in a fiber-to-the-curb (FTTC) communication system.

8. The receiver of claim 1, wherein the control signals change resolution of the A/D converter and precision of the digital filters.

9. The receiver of claim 8, wherein the modulation scheme is a QPSK modulation scheme and the receiver is part of a remote node in an FTTC communication system.

10. The receiver of claim 1, wherein the receiver further comprises a low-pass filter adapted to filter the variance prior to input to the control processor.

11. A method for processing, in a receiver, an input signal generated using a modulation scheme, comprising the steps of:
    (a) digitizing the input signal using an A/D converter of the receiver;
    (b) filtering the digitized signal using one or more digital filters of the receiver;
    (c) determining phase values in the filtered signal using a phase detector of the receiver;
    (d) generating the variance from the phase values using a variance generator of the receiver;
    (e) generating control signals to adaptively adjust the processing of at least one of the A/D converter and the one or more digital filters based on the variance using a control processor of the receiver.

12. The method of claim 11, wherein the control signals change resolution of the A/D converter.

13. The method of claim 11, wherein the control signals change a number of bits of precision in at least one of the digital filters.

14. The method of claim 11, wherein the control signals turn on and off at least one of the digital filters.

15. The method of claim 11, wherein the modulation scheme is a phase-based modulation scheme.

16. The method of claim 15, wherein the modulation scheme is a quadrature-phase shift-keying (QPSK) modulation scheme.

17. The method of claim 11, wherein the receiver is part of a remote node in a fiber-to-the-curb (FTTC) communication system.

18. The method of claim 11, wherein the control signals change resolution of the A/D converter and precision of the digital filters.

19. The method of claim 18, wherein the modulation scheme is a QPSK modulation scheme and the receiver is part of a remote node in an FTTC communication system.

20. The method of claim 11, wherein the receiver further comprises a low-pass filter adapted to filter the variance prior to input to the control processor.

* * * * *